United States Patent [19]

Crowell

[11] Patent Number: 4,691,664
[45] Date of Patent: Sep. 8, 1987

[54] PET RECEPTACLE

[75] Inventor: William H. Crowell, North Wales, Pa.

[73] Assignee: The Cool Water Corporation, Lansdale, Pa.

[21] Appl. No.: 826,316

[22] Filed: Feb. 5, 1986

[51] Int. Cl.⁴ .............................................. A01K 7/00
[52] U.S. Cl. ......................................... 119/61; 62/457
[58] Field of Search ...................... 119/61, 73; 62/371, 62/372, 457

[56] References Cited

U.S. PATENT DOCUMENTS

| 3,161,031 | 12/1964 | Flannery | 62/457 |
| 3,498,268 | 3/1970 | Sleith et al. | 119/61 |
| 4,319,629 | 3/1982 | Hotta | 62/457 |
| 4,383,422 | 5/1983 | Gordon et al. | 62/457 |
| 4,485,636 | 12/1984 | Hilado | 62/457 X |
| 4,520,633 | 6/1985 | Hoydic | 62/371 X |

FOREIGN PATENT DOCUMENTS 2925499  1/1981  Fed. Rep. of Germany ........ 62/457

Primary Examiner—Robert P. Swiatek
Attorney, Agent, or Firm—Joseph W. Molasky & Assocs.

[57] ABSTRACT

A dish-like receptacle for serving liquids to small animals whereby a coolant source maintains the liquid at a reduced temperature over extended periods. The coolant source is a frozen gel which may be refrozen, regenerated or replaced as needed.

13 Claims, 6 Drawing Figures

PET RECEPTACLE

This invention relates to a pet receptable for enhancing the potability of liquids by maintaining the temperature of the fluid below ambient levels over extended periods.

Most domesticated animals require an almost constant supply of potable water, particularly during periods of high humidity or strenuous activity, and many owners attend to this need by placing containers of fresh water in easily accessible location. Unfortunately, most liquids lowe their refreshing character when exposed to ambient temperatures for any apprecialbe time and water can become insipid within a relatively short period in warm or hot weather.

Most pet owners overcome this difficulty by attentively replacing the warmed water with a fresh supply and ice is sometimes used to extend the salubrious qualities of the liquid.

Obviously, these remedies are not a satisfactory solution to the problem and, therefore, there is a need for means by which an owner can ensure a cool and potable water supply for his pet over extended periods and during his absence.

THE INVENTION

It is an object of this invention to provide a pet receptable equipped with means for maintaining liquids in a cool and potable condition over extended periods.

Another object is to provide a dish-type receptacle which is equipped with a cooling means which may be regenerated or replaced as needed with little effort and a modicum of expense.

Still another object is to provide an economical and safe receptable in which the cooling means is protected from contact and will not expose either the animal or its owner to risk.

These and other objects are achieved are achieved by providing a receptable which includes a coolant for imparting to liquids a temperature approximately equal to that of the coolant composition.

The coolant is a gelatinous material which has a frezzing point and a latent heat of fusion greater than that of the liquid sought to be cooled. This combination of properties allows the coolant to remove more BTU's from said liquid than an equal mass of frozen water so that the temperature of the fluid is not only reduced in a more efficacious manner but it has the ability to maintain this reduced temperature over an extended period.

The coolant may be incorporated into the receptacle interior for direct contact with the liquid-retaining cavity or, it may be confined within a cartridge for insertion into the receptacle as a discrete component.

When the coolant composition is incorporated into the interior of the receptacle it is made operable by placing the entire unit a freezer until the composition is frozen solid. This freezing operation can be achieved within about four to six hours and once it has occurred the receptable is equipped to exert a cooling effect on added liquids for periods of up to about 72 hours.

Alternatively, when the coolant composition is contained within a cartridge this element must be inserted in its frozen state in an accommodating orifice within the receptable so as to bring it into contact with the liquid-holding cavity. This contact withdraws heat from the liquid which is sought to be cooled and it will result in liquid temperatures which are essentially equal to that of the coolant composition.

The coolants employed in this invention are non-toxic, gelatinous compositions which are manufactured and sold by Stanbel, Inc. of Springfield, Mass. These gels are essentially leakproof and their useful life is such that they may be re-frozen indefinitely without any discernible loss in cooling ability.

The receptacle of this invention and its cartridge may be fabricated from any sheet material which is capable of being die-formed or moded by known techniques. Typical of such materials are, for example, polyolefin plastics and rubber, but it will be appreciated by those skilled in the art that other functionally equivalent materials may also be employed without departing from the spirit or scope of this invention.

These and other objects will be more readily apparent from the appended Drawings and the following embodiments.

THE DRAWINGS

THE EMBODIMENTS

The pet receptacle of this invention may be constructed with means for receiving a discrete cartridge containing the coolant composition or, alternatively, the coolant may be incorporated into the receptacle within a hollow interior.

Figure 1:
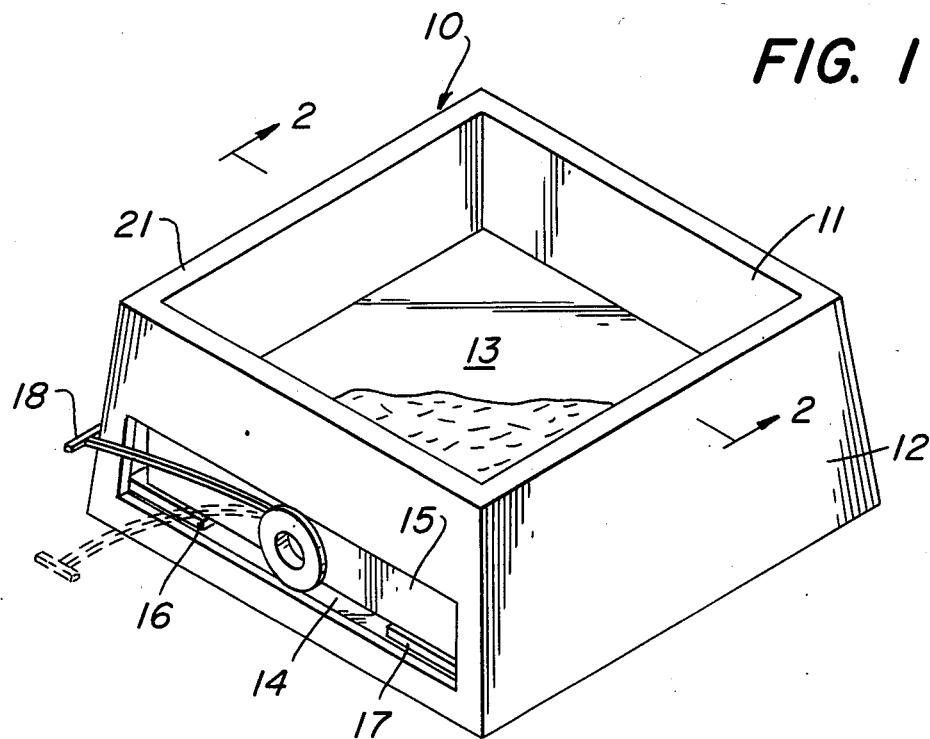
FIG. 1 is a perspective view of a pet receptacle equipped with a cooling cartridge.
Figure 2:
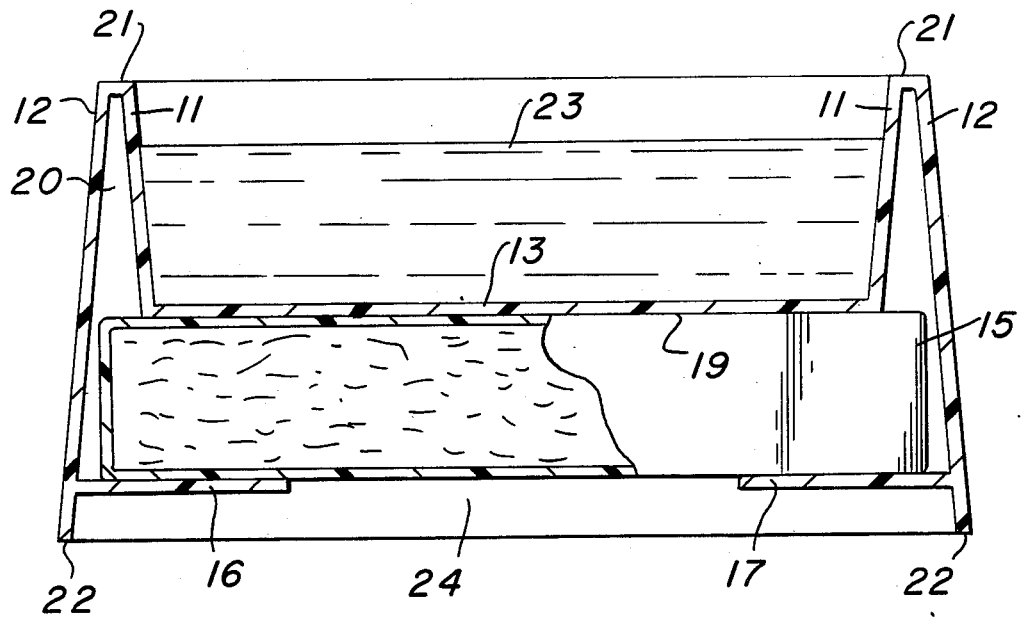
FIG. 2 is a sectional view of the pet receptacle shown in FIG. 1 along line 2—2.
Figure 3:
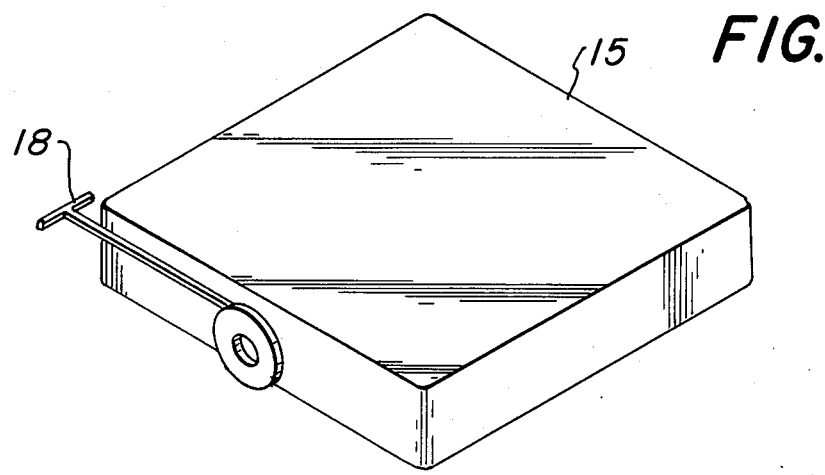
FIG. 3 is a perspective view of the cooling cartridge shown in FIG. 1.
Figure 4:
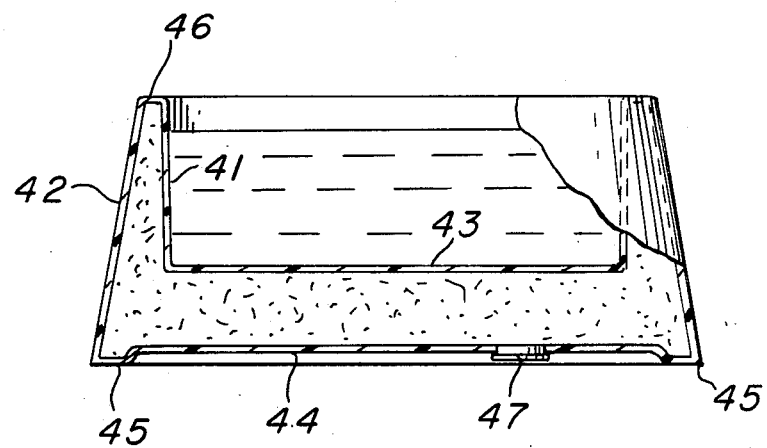
FIG. 4 is a sectional view illustrating an alternate form of pet receptacle according to this invention.

FIGS. 1-3 illustrate a receptacle of the first type, that is, the combination of a container and discrete cartridge, whereas, FIG. 4 illustrates a unitary container equipped with cavity means for retaining the coolant mixture. In either case the receptacle and cartridge may be fabricated from any high impact fluid impervious material but polyolefins are preferred because they are economical and lend themselves to injection molding techniques.

In FIG. 1 receptacle 10 is shown in square but this is for illustration only and a rectangular, circular or oval design may also be employed. The receptacle is characterized by a circumscribing inner wall 11, a circumjacent outer wall 12 and a base 13 which combines with said inner wall 11 to form a liquid-retaining cavity. An elongated aperture 14 in the outer wall provides means for inserting a coolant cartridge 15.

The inner wall 11 and outer wall 12 are downwardly divergent and they form between respective inner surfaces and beneath rim 21 a continuous passageway or chamber 20 (FIG. 2). The sidewall 11 terminates in base 13 but outer wall 12 extends downwardly beyond said base to form a peripheral support means 22.

Extending laterally from the inner surface of outer wall 12, beneath base 13, are opposing flange members 16 and 17. These provide a support means for cartridge 15 and together with base 13 they form a channel into which said cartridge can be slidingly engaged. Accordingly, the thickness of the cartridge is essentially equal to the opening between base 13 and flange members 16 and 17 so that in its operable or inserted mode the top surface 19 of cartridge 15 will be intimate contact with said base. This contact enhances the cooling process by withdrawing heat from the base while simultaneously imparting to the liquid 23 a cooling temperature essentially equal to that of the coolant.

The ability to maintain reduced temperatures over extended periods is further enhanced by a construction feature which entraps cool air within chamber 20 for contact with inner wall 11. This is a particularly advantageous aspect of the invention becuase chamber 20 encircles the cavity 13 and thus imparts to the liquid an essentially uniform temperature.

Still another feature which contributes to the effectiveness of this system is the circumjacent support identified as 22 in FIG. 2. This support consists of a uniformly flat peripheral skirt which, on an essentially flat surface, protects against warming air currents by entrapping within enclosed area 24 the cool air which emanates from cartridge 15.

To remove cartridge 15 the user simply grips tab 18 and pulls in the direction of the dotted lines in FIG. 1. This tab may be fabricated from any resilient material but a plastic such as polyethylene or polypropylene is preferred because it is durable and has memory so that is will return to its original position even after repeated use.

FIG. 4 shows a die-formed receptacle containing the coolant liquid within a cavity formed by its bounding inner surfaces. This receptacle is integrally constructed to form a reservoir which confines the coolant within a hollow interior for contact with base 43 and circumscribing sidewall 41. Extending downwardly from rim 46 is an outer wall segment 42 which terminates in a circumscribing base 45 so that the underside 44 of the receptacle can remain elevated above any flat supporting surface. The construction of this support is such that it retains cool air within the enclosure beneath the receptacle while preventing the ingress of warm ambient air.

The coolant liquid may be added to the receptacle at the time of manufacture or it may be added via an orifice which is stoppered by plug 47. Thereafter, if the coolant is to be replaced or regenerated plug 47 can be withdrawn, the contents removed and a new coolant added.

In practice, the coolent should not fill the reservoir completely; instead, a small void should be provided to allow for the expansive effect which occurs when the liquid coolant is converted to its solid state.

The apparatus of FIG. 4 is utilized by placing the receptacle into a freezer until the coolant liquid is completely frozen. In general, the coolant will freeze to a solid within about four to six hours and it will provide a cooling effect for a period of up to about 72 hours. Thereafter, the coolant can be refrozen and the receptacle used again, interminably, with no discernible loss in cooling properties.

Figure 5:
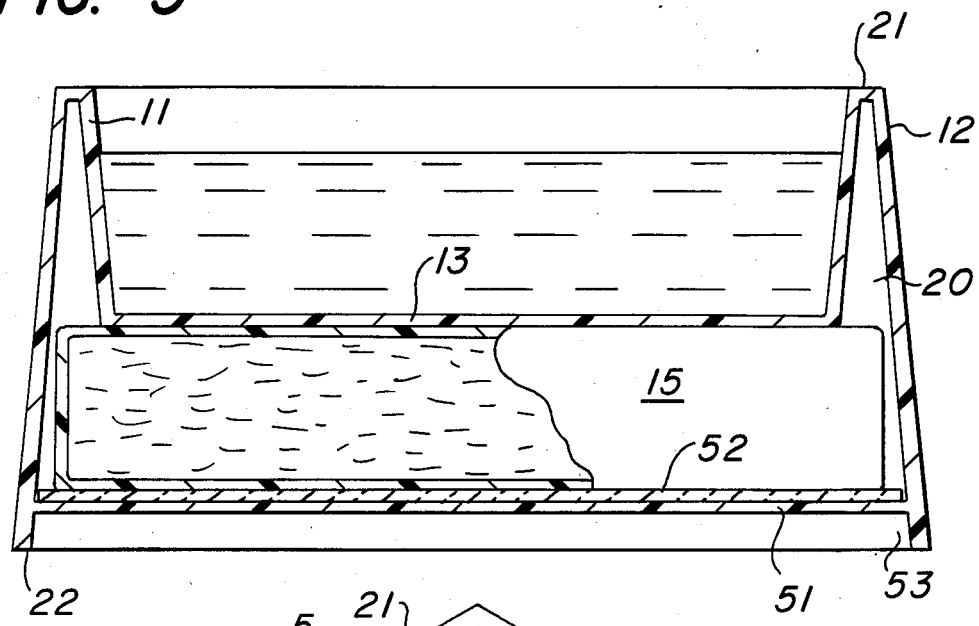
FIG. 5 is a sectional view illustrating still another form of pet receptacle according to this invention.

In FIG. 5 thate is shown an improvement in the means for securing cartridge 15. According to this embodiment the support for said cartridge consists of a discrete lateral member 51 which extends from one inner sidewall to an opposite sidewall. Superimposed on this lateral member is an insulating layer 52 comprised of a resilient synthetic material such as urethane or styrofoam which, in combination with base 13, forms a channel into which the coolant cartridge is slidingly engaged. In addition to providing a secure fit for said cartridge this layer protects against the escape of cool air and it insulates the coolant liquid from the warming effects of surrounding ambient air.

Figure 6:
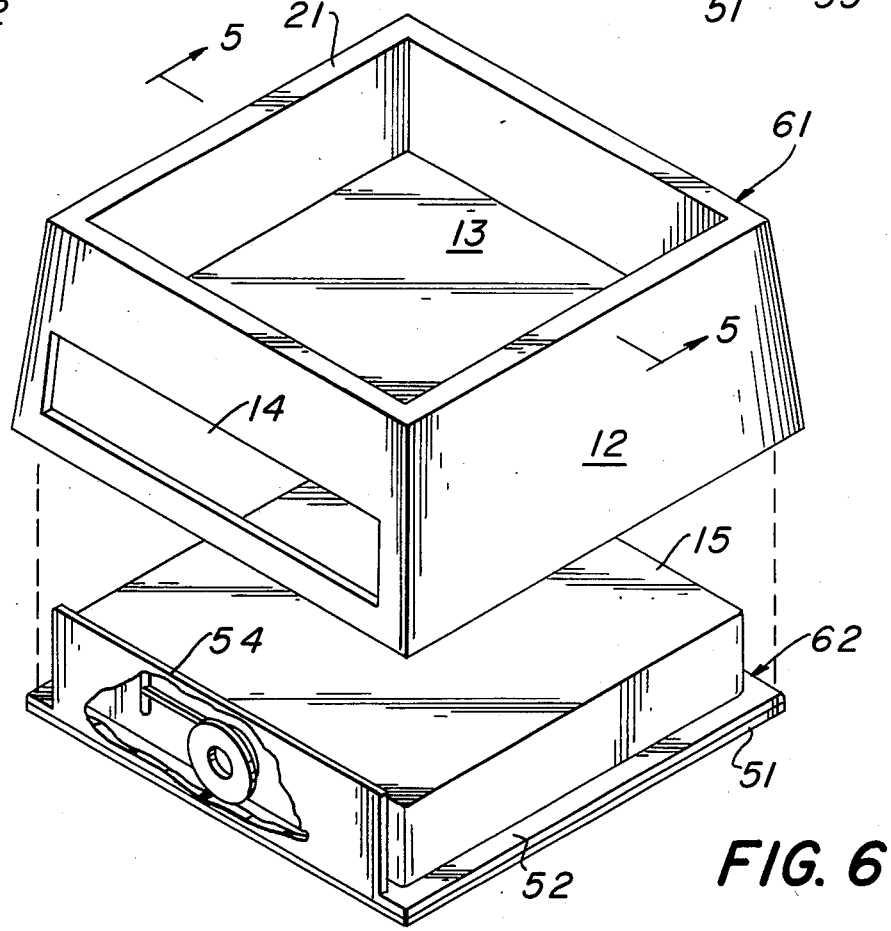
FIG. 6 is also perspective view which shows the means by which the pet receptacle of FIG. 5 may be assembled.

The components comprising this embodiment (FIG. 5) and their mode of assembly are shown in FIG. 6. This embodiment consists of a unitary shell 61 which is fittingly engaged with the unit identified generally as 62, that is, a lateral member 51 and a superimposed insulating layer 52 which serves to cushion cartridge 15 and impress same upwardly for contact with base 13 (FIG. 5).

Extending upwardly from insulating layer 52 is a flexible flap 54 which covers the aperture 14 to prevent the ingress of ambient air and the escape of cool air. Flap 54 may be discrete segment sealingly joined to the insulating layer 52 or it may be an integral part of said layer in which event it constitues a preformed segment. This flap is approximately equal in length to aperture 14 so that it can be drawn through said aperture for the unimpeded removal of the cartridge 15. Thereafter, when a new or regenerated cartridge is inserted flap 54 is returned to its original position.

In practice, unit 62 is impressed into shell 61 and its terminal ends are secured to the interior sidewalls 61 by any suitable sealing means as, for example, by adhesives or by the application of a thermal heat seal.

According to one aspect of this embodiment base 62 is impressed fully into shell 61 to provide the insulating airspace shown as 53 in FIG. 5. Alternatively, base 62 and shell 61 may be brought into registry so that in their assembled mode lateral member 51 and the circumjacent support 22 lie in the same plane and thus afford a flat common underside.

This invention has been described by reference to precise embodiment but it will be appreciated by those skilled in the art that this invention is subject to modificaiton and to the extent that those modifications would be obvious to one of ordinary skill they are within the scope of the appended claims.

What is claimed is:

1. A dish-type pet feeding receptacle equipped with means for cooling potable liquids and maintaining same at reduced temperatures over extended periods which comprises:

(1) a unitary container means consisting essentially of a cavity circumscribed by downwardly divergent inner walls and outer walls which are joined by a rim but otherwise spaced apart from a substantially liquid-free passageway of generally V-shaped cross section, said inner walls terminating in a flat base having a top-side and an underside and said outer walls extending downwardly beyond said inner walls and said base to form a peripheral support; and (2) a replacable coolant cartridge resting upon said peripheral support and being in intimate contact with substantially the entire underside of said base.

2. The receptable according to claim 1 wherein said cartridge contains a gelatinous composition having a freezing point greater that water.

3. The receptacle according to claim 1 wherein said outer walls include an aperture through which said cartridge is inserted.

4. The receptacle according to claim 1 wherein said outer walls include a pair of opposing flanges which extend laterally from its facing inner surfaces and which, in combination with the underside of said base, forms a channel into which said cartridge is slidingly engaged.

5. The receptacle according to claim 4 wherein the cartridge is in intimate contact with said base and fills the void between said flanges and said underside.

6. A receptacle according to claim 5 wherein said cartridge extends horizontally substantially across said V-shaped cross seciton.

7. The receptacle to claim 1 wherein said peripheral support encircles the base and forms an enclosure which prevents cool air from excaping into the atmosphere.

8. The receptacle according to claim 1 wherein the facing inner surfaces of said outer walls are joined by a flat lateral support having an upper surface and lower surface which, in combination with the underside of said base, forms a channel into which said cartridge is slidingly engaged.

9. The receptacle according to claim 8 wherein a flexible layer of insultating material is superimposed on the upper surface of said lateral support.

10. The receptacle according to claim 9 wherein said layer of insulating material is selected from among urethane and styrofoam in sheet form.

11. The receptacle according to claim 9 wherein said outer walls include an aperture through which said cartridge is inserted.

12. The receptacle according to claim 11 wherein the layer of insulating material includes a segment which extends upwardly to cover said aperture.

13. A receptacle according to claim 8 wherein said cartridge extends horizontally substantially across said V-shaped cross section.

* * * * *